United States Patent [19]

Kawashima et al.

[11] Patent Number: 5,008,331

[45] Date of Patent: Apr. 16, 1991

[54] THERMOPLASTIC RESIN COMPOSITION

[75] Inventors: Kouzo Kawashima, Yokkaichi; Takao Morikawa, Yokohama; Teruo Aoyama; Akira Kamiya, both of Yokkaichi, all of Japan

[73] Assignee: Japan Synthetic Rubber Co., Ltd., Tokyo, Japan

[21] Appl. No.: 488,429

[22] Filed: Feb. 27, 1990

Related U.S. Application Data

[62] Division of Ser. No. 183,897, Apr. 20, 1988, abandoned.

[30] Foreign Application Priority Data

Apr. 21, 1987 [JP] Japan ............................ 62-96269

[51] Int. Cl.$^5$ .............................................. C08L 51/04
[52] U.S. Cl. ........................................ 525/84; 525/76; 525/80; 525/86
[58] Field of Search ................................. 525/84, 86

[56] References Cited

U.S. PATENT DOCUMENTS 3,442,979 5/1969 Ott et al. ............................ 525/86
4,104,328 8/1978 Swoboda et al. .................. 525/84

FOREIGN PATENT DOCUMENTS 190884 8/1986 European Pat. Off. .

*Primary Examiner*—Jacob Ziegler
*Attorney, Agent, or Firm*—Oblon, Spivak, McClelland, Maier & Neustadt

[57] ABSTRACT

A thermoplastic resin composition consisting essentially of (A) 10-90% by weight of a graft copolymer (A) obtained by polymerizing a mixture of an alkenyl cyanide compound and an aromatic alkenyl compound in the presence of a butadiene rubber latex in which 40-100% by weight of butadiene rubber particles (A-1) having an average particle diameter of at least 1,300 Å but less than 2,100 Å, 0-60% by weight of butadiene rubber particles (A-2) having an average particle diameter of 2,100 Å or more and 0-20% by weight of butadiene rubber particles (A-3) having an average particle diameter other than the average particle diameters of the particles (A-1) and (A-2) are dispersed, provided that the alkenyl cyanide compound content in the resin component of the graft copolymer (A) is at least 10% by weight but less than 30% by weight, and (B) 90-10% by weight of a copolymer of an alkenyl cyanide compound with an aromatic alkenyl compound having an alkenyl cyanide compound content of 30-40% by weight, the proportion of the butadiene rubber component in the composition being 5-30% by weight. Said thermoplastic resin composition is excellent in surface appearance of molded article, shows an improved ejection whiteining during molding, and a high gloss of molded article.

23 Claims, No Drawings

THERMOPLASTIC RESIN COMPOSITION

This application is a division of application Ser. No. 183,897, filed on Apr. 20, 1988, now abandoned.

This invention relates to a thermoplastic resin composition which can give a molded article having an improved surface appearance, a diminished ejection whitening during molding and a high gloss of molded article.

Rubber-modified styrene resins such as ABS resin and the like are in wide use as a general-purpose thermoplastic resin because they are superior in impact resistance, mechanical properties, moldability, gloss, etc.

The above rubber-modified styrene resin are used in various fields such as home electrical appliances, communication equipment, automobile parts, industrial products, etc. in which the above characteristics are utilized.

In the molding industry in which the rubber-modified styrene resins are used, there is a trend of thinning the wall of a large-size shaped article in order to achieve resource saving and cost reduction. The molded articles produced under such conditions include, for example, light electrical appliances such as telephone, vacuum cleaner, television and the like, and in the case of these shaped articles, their surface appearances (e.g. weld line, surface gloss) become often a problem.

There is another problem that when shaped articles are taken from a mold they cause a whitening phenomenon in the step of ejection with ejection pins.

On the other hand, in the industry of home electrical appliances in which the rubber-modified styrene resins are mainly used, enhancement of productivity is carried out by shortening the molding cycle, namely conducting the molding in a short time for the purpose of reduction of cost. However, it causes a problem of degradation of surface appearance of a molded article. Hence, it is desired to develop a material capable of providing a molded article having a good appearance.

The properties of a rubber-modified styrene resin are generally influenced by the composition of rubber phase, gel content in rubber phase, rubber particle diameter, rubber particle diameter distribution, rubber content, etc.

In the industry, in order to improve the appearance of a molded article of rubber-modified styrene resin, it has been tried to enhance the fluidity of the resin by reducing the viscosity of the resin and also to reduce the rubber content in the resin. However, these approaches result in a reduction of mechanical properties of the resin such as impact resistance which are the important properties of the resin, and rather this problem must be solved now.

In Japanese Patent Publication No. 8,691/85, attention was paid to the particle diameters of rubber to be used in a rubber-modified styrene resin and it was proposed to use, in the production of an ABS resin by emulsion polymerization, a latex mixture consisting of (a) a conventionally used polybutadiene or butadiene copolymer latex whose particles have such particle diameter distribution that the average particle diameter is 0.2 $\mu$ (2,000 Å) or more and particles having large diameters of 1 $\mu$ (10,000 Å) or more are preferably contained and (b) a styrene-butadiene copolymer latex having an average particle diameter of 0.15 $\mu$ or less for the purpose of improving the gloss of molded article.

However, this process is still not satisfactory in improving the surface appearance (e.g. weld line, etc.) and is incapable of diminishing the ejection whitening to such an extent that molded articles can be used in practice.

The present inventors have made extensive research for solving the problem of improving the surface appearance of a molded article of a rubber-modified styrene resin by diminishing the ejection whitening during molding, thereby giving the molded article a high gloss and maintaining the impact resistance-fluidity balance (this is an important property). As a result, it has been found that the particle diameters of a rubbery polymer latex used in graft polymerization and the content of an alkenyl cyanide compound in an alkenyl monomer mixture also used in graft polymerization are very important, and the above problem has been solved by the use of one or two rubbery polymer latexes having specific particle diameters.

According to this invention, there is provided a thermoplastic resin composition consisting essentially of (A) a graft copolymer obtained by polymerizing a monomer mixture consisting of an alkenyl cyanide compound and an aromatic alkenyl compound in the presence of a butadiene rubber latex in which (A-1) 40–100% by weight of butadiene rubber particles having an average particle diameter of at least 1,300 Å but less than 2,100 Å, (A-2) 0–60% by weight of butadiene rubber particles having an average particle diameter of 2,100 Å or more and (A-3) 0–20% by weight of butadiene rubber particles having an average particle diameter other than the average particle diameters of the particles (A-1) and (A-2) are disposed, said graft copolymer (A) having an alkenyl cyanide compound content in the resin component (the graft copolymer minus the rubber component) of at least 10% by weight but less than 30% by weight, and (B) a copolymer of an alkenyl cyanide compound and an aromatic alkenyl compound having an alkenyl cyanide compound content of 30–40% by weight, the weight ratio of (A)/(B) in the composition being 10–90/90–10 and the proportion of the butadiene rubber component in the composition being 5–30% by weight.

In this invention, it is particularly important to use, in place of the conventional latex having such a wide particle diameter distribution that the latex contains particles having a large particle diameter of 10,000 Å or more and has an average particle diameter of 2,000 Å or more, a butadiene rubber latex having an average particle diameter falling in a specific range, graft-copolymerize in the presence thereof an alkenyl monomer mixture containing a specific amount of an alkenyl cyanide compound and use the resulting graft copolymer (A) and a specific alkenyl copolymer (B). The butadiene rubber particles (A-1) have an average particle diameter at least 1,300 Å but less than 2,100 Å, preferably 1,500–2,000 Å, more preferably 1,600–1,900 Å and occupy 40–100% by weight, preferably 50–100% by weight, more preferably 60–100% by weight and most preferably 70–97% by weight of the whole rubber particles. The butadiene rubber particles (A-2) have an average particle diameter of 2,100 Å or more, preferably 2,200–7,000 Å, more preferably 2,200–2,800 Å and occupy 0–60% by weight, preferably 0–50% by weight, more preferably 0–40% by weight and most preferably 3–30% by weight of the whole rubber particles. The butadiene rubber particles (A-3) having an average particle diameter other than the average particle diameters of the particles (A-1) and (A-2) occupy 0–20% by weight, preferably 0–10% by weight and more preferably 0–5% by weight of the whole rubber particles.

The graft copolymer (A) in the composition of this invention can be produced by polymerizing an alkenyl monomer mixture having an alkenyl cyanide compound content of at least 10% by weight but less than 30% by weight, preferably 20–29% by weight, in the presence of the above-mentioned butadiene rubber particles (A-1), (A-2) and (A-3) in the latex form.

The content of the bound alkenyl cyanide compound in the copolymer (B) to be blended with the graft copolymer (A) is 30% by weight or more, preferably 30.5–35% by weight and more preferably 31–35% by weight. The weight ratio of the graft copolymer (A) to the copolymer (B) is 10–90/90–10, preferably 10–70/-90–30. The content of the rubber component in the resin composition of this invention is 5–30% by weight, preferably 10–25% by weight.

In this invention, the important point lies in the particle diameter and contents of the butadiene rubber particles in the graft copolymer (A). When the content of the particles (A-1) is less than 40% by weight, the gloss of a molded article aimed at in this invention cannot be achieved. The use of the particles (A-1) and the particles (A-2) in combination is preferred because it provides improved impact resistance; however, when the content of (A-2) is more than 60% by weight of the whole rubber particles, the gloss and the surface appearance of a molded article become inferior.

When the content of the particles (A-3) is more than 20% by weight of the whole rubber particles, the balance of physical properties of a molded article in respect of gloss, surface appearance and impact resistance becomes bad.

The content of the alkenyl cyanide compound in the resin component in the graft copolymer (A) is 10–30% by weight, preferably 20–29% by weight. When the content is less than 10% by weight, the impact resistance and gloss become inferior, and when the content is more than 29% by weight, the impact resistance becomes inferior.

The content of the alkenyl cyanide compound in the copolymer (B) is 30–40% by weight, preferably 30.5–35% by weight, and more preferably 31–35% by weight. When the content is less than 30% by weight, the impact resistance becomes inferior and when the content is more than 40% by weight, the thermal stability becomes low and discoloration is caused. When the weight ratio of the graft copolymer (A) to the copolymer (B) is less than 10, the impact resistance becomes low, and when the content is more than 90, the rigidity and fluidity become low and the surface appearance of molded article becomes inferior. When the content of the rubber component in the resin composition of this invention is less than 5% by weight, the impact resistance becomes low, and when the content is more than 30% by weight, the rigidity and fluidity become inferior and simultaneously the surface appearance becomes inferior.

The difference between the bound acrylonitrile content in the resin component of the graft copolymer (A) and the bound acrylonitrile content in the resin component of the copolymer (B) is 3–30% by weight, preferably 4–15% by weight. A resin composition having such a difference in bound acrylonitrile content is much better in balance of gloss and impact resistance, and is preferred.

Thus, the object of this invention can be achieved only when a specific graft copolymer (A) and a specific copolymer (B) are used in combination in the given proportions.

In order to improve the surface appearance of a molded article obtained by practical molding it is necessary that the resin itself has an appropriate fluidity and impact resistance, and therefore, the fluidity of the resin per se must be increased and at the same time the surface appearance of the resin itself must be made good.

When the rubber particles (A-1) of smaller particle diameters are contained in the graft copolymer (A) in a proportion of less than 40% by weight of the whole rubber particles, the gloss and the surface appearance become inferior though the impact resistance is good.

In order to improve the surface appearance and gloss, it is very important that the butadiene rubber particles used have the desired average particle diameters.

Attention should be said to the fact that when the content of the alkenyl cyanide compound in the resin component (consisting of an alkenyl monomer mixture) of the graft copolymer (A) is more than 30% by weight the gloss and impact resistance are not satisfactory, and when the content of the alkenyl cyanide compound in the copolymer (B) is less than 30% by weight the impact resistance and chemical resistance are not satisfactory.

Thus, in this invention, it is important that the resin component of the graft copolymer (A) and the copolymer (B) have the desired alkenyl cyanide compound contents for improving the impact resistance and fluidity.

As the butadiene rubber used in the graft copolymer (A) of this invention, there may be used a butadiene homopolymer and butadiene copolymers such as butadiene-styrene copolymer, butadiene-acrylonitrile copolymer and the like. The gel content in the butadiene rubber used in this invention is preferably 60–90% by weight.

The latex of such a butadiene rubber can be produced according to a conventional emulsion polymerization method. In order to control the particle diameter distribution and the gel content of the produced latex in the respective desired ranges, it is necessary to vary the weight ratio of monomers to polymerization water, the amount of emulsifier, the electrolyte, etc. used during the polymerization depending upon purposes. In order to satisfy the above characteristics, it is necessary to control the polymerization conditions, for example, polymerization temperature, polymerization time, amount of chain transfer agent, etc.

The rubber latex having a specific average particle diameter used in this invention can be produced by adding, to a mixture of butadiene and an alkenyl group-containing monomer copolymerizable therewith, a small amount of an emulsifier and appropriate amounts of an electrolyte, water and a catalyst, and then subjecting the resulting mixture to polymerization at a controlled polymerization rate with care being taken not to cause agglomeration during the polymerization.

In this invention, an alkenyl cyanide compound and an aromatic alkenyl compound are graft-copolymerized on the rubber particles mentioned above. In this case, a small amount of other monomer copolymerizable with the above monomers such as acrylates, methacrylates and the like may also be used, if necessary.

Examples of the aromatic alkenyl compound are styrene, α-methylstyrene, vinyltoluene, halogenated styrene and the like. These compounds may be used alone or in admixture of two or more. Examples of the alkenyl cyanide compound are acrylonitrile, methacrylonitrile and the like. These may be used alone or in admixture of two or more. An acrylate or methacrylate monomer may, if necessary, be used together with the above monomers. The acrylate and methacrylate monomers include methyl, ethyl, propyl, butyl and phenyl acrylates and methacrylate.

The particularly preferred monomer mixture is a mixture of acrylonitrile and styrene.

The graft copolymer (A) of this invention can be obtained by graft-copolymerizing preferably 40-90 parts by weight, more preferably 45-85 parts by weight, most preferably 50-85 parts by weight, of a monomer mixture as mentioned above, on preferably 10-60 parts by weight, more preferably 15-55 parts by weight, most preferably 15-50 parts by weight, of butadiene rubber particles as mentioned above.

The grafting degree of the graft copolymer (A) is preferably 40-90% by weight, more preferably 40-80% by weight. When the above-mentioned monomer mixture is graft-copolymerized on the above-mentioned butadiene rubber particles in the above-mentioned proportions, a grafting degree of 40-90% by weight can easily be achieved.

The methyl ethyl ketone-soluble portion of the graft copolymer (A) of this invention has an intrinsic viscosity [0]of preferably 0.3-0.8 dl/g, more preferably 0.3-0.65 dl/g as measured at 30° C in methyl ethyl ketone.

In the graft-copolymerization, the addition of the above-mentioned components, including the monomer mixture, the radical polymerization initiator, the emulsifier and the like, can be conducted according to conventionally employed methods, such as (1) a method comprising adding all the components at one time at the start of polymerization, (2) a method comprising adding all the components in two or more portions or (3) a method comprising adding a part or the whole of the components continuously at a given rate.

The radical polymerization initiator used in the graft-copolymerization includes, for example, organic hydroperoxides (e.g. cumene hydroperoxide, diisopropylbenzene hydroperoxide, p-methane hydroperoxide or the like), redox catalysts (e.g. a sugar-containing pyrophosphoric acid recipe, a sulfoxylate recipe or the like); persulfates; azobisisobutyronitrile; and peroxides (e.g. benzoyl peroxide and the like).

A molecular weight modifier may be used in this invention, and it includes, for example, mercaptans such as t-dodecylmercaptan, n-dodecylmercaptan, mercaptoethanol and the like; a terpene mixture consisting of terpinolene, dipentene, t-terpinene and a small amount of other cyclic terpenes; halogenated hydrocarbons such as chloroform, carbon tetrachloride and the like; etc.

The emulsifier includes, for example, rosinates such as potassium rosinate, sodium rosinate and the like; alkali metal salts of fatty acids, such as potassium oleate, sodium oleate, potassium laurate, sodium laurate, sodium stearate, potassium stearate and the like; salts of sulfuric acid esters of aliphatic alcohols, such as sodium laurylsulfate and the like; and alkylarylsulfonate such as sodium dodecylbenzenesulfonate and the like.

The thus obtained graft copolymer (A) is mixed with the copolymer (B) to adjust the content of the rubber component in the resulting resin composition to a desired level.

In this invention, the types of the alkenyl cyanide compound and the aromatic alkenyl compound used in the copolymer (B) are the same as mentioned with respect to the graft copolymer (A). Specifically, the copolymer (B) may be a commercially available acrylonitrile-styrene copolymer (AS resin) or the like. Other monomers copolymerizable with the alkenyl cyanide compound and the aromatic alkenyl compound as mentioned in respect of the graft copolymer (A) may be, if necessary, used in the copolymer (B), too. The methyl ethyl ketone-soluble portion of the copolymer (B) has an intrinsic viscosity $[\eta]$ of preferably 0.35-0.85 dl/g, more preferably 0.38-0.75 dl/g as measured at 30° C. in methyl ethyl ketone.

The thermoplastic resin composition of this invention can also be blended with other thermoplastic resins such as polycarbonate resin or the like, particularly engineering resin to improve the gloss and surface appearance as compared with conventional styrene resins.

The thermoplastic resin composition of this invention can further comprise conventional additives, coloring agents, stabilizers, antistatic agents, plasticizers, etc. for conventional plastics.

According to this invention, there can be obtained a thermoplastic resin composition capable of providing a molded article with an improved surface appearance, good gloss and excellent impact resistance, by blending the graft copolymer (A) obtained by grafting an alkenyl monomer mixture containing a specific proportion of an alkenyl cyanide compound on a butadiene rubber particles having a specific average particle diameter, and the copolymer (B) having a specific alkenyl cyanide compound content.

The term "gel content of rubber" is used herein in the following meaning:

a latex was coagulated, and the coagulation product (a rubber) was dried and then dissolved in toluene at room temperature (20° C.) for 20 hours. The solution was filtered through a 200-mesh wire net. The proportion of the weight of insolubles remaining on the net based on the weight of the rubber is referred to as "gel content of rubber".

This invention is described in more detail below referring to Examples. However, this invention should not be restricted to the Examples.

In the Examples, % and parts are by weight unless otherwise specified.

The analytical methods employed in the Examples are explained below.

(1) Diameters of particles of latex:

Measured according to a creaming method using sodium alginate.

(2) Grafting degree:

A given amount (x) of a graft copolymer was placed in acetone, and the mixture was shaken for 2 hours by a shaker to completely dissolve the free ungrafted polymer. The resulting solution was centrifuged at 23,000 rpm for 30 minutes in a centrifuge to separate insolubles. The insolubles were dried at 120° C. for 1 hour in a vacuum drier to obtain insolubles (y).

The grafting degree of the graft copolymer was calculated by the following equation:

$$\text{Grafting degree (\%)} = \frac{[(y) - (x) \times \text{rubber fraction of the graft polymer}]}{[(x) \times \text{rubber fraction in the graft polymer}]} \times 100$$

REFERENCE EXAMPLE 1

Production of rubbery polymer latexes

(1) Production of polybutadiene latex (a-1)

| | |
|---|---|
| Butadiene | 100 parts |
| Distilled water | 85 parts |
| Potassium rosinate | 2.0 parts |
| Potassium phosphate | 1.0 part |
| Potassium hydroxide | 0.1 part |
| t-Dodecylmercaptan | 0.2 part |
| Potassium persulfate | 0.3 part |

A mixture of the above components was fed to a pressure reactor and subjected to polymerization for 20 hours at 50° C. The polymerization was continued while increasing the temperature at a rate of 5° C. per 5 hours to 75° C. The total polymerization time was 50 hours. The conversion was 90%.

After the completion of the polymerization, unreacted butadiene was removed by steam distillation to obtain a polybutadiene latex (a-1).

The gel content and average particle diameter of the rubber particles of the latex (a-1) were as follows:

| | |
|---|---|
| Gel content | 75% |
| Average particle diameter | 2,500 Å |

According to the observation of the electron micrograph, the particle diameter distribution was very narrow and no particles having particle diameters of 10,000 Å or more were present.

(2) Production of polybutadiene latex (a-2)

| | |
|---|---|
| Butadiene | 100 parts |
| Distilled water | 95 parts |
| Potassium rosinate | 2.0 parts |
| Potassium phosphate | 1.0 part |
| t-Dodecylmercaptan | 0.2 part |
| Potassium persulfate | 0.3 part |

A polybutadiene latex (a-2) was produced by repeating the same procedure as in (1) above, except that a mixture of the above components was used.

The gel content and average particle diameter of the rubber particles of the latex (a-2) were as follows:

| | |
|---|---|
| Gel content | 78% |
| Average particle diameter | 1,700 Å |

According to the observation of the electron micrograph, the particle diameter distribution was very narrow and substantially no particles having particle diameters of 1,500 Å or less and 2,100 Å or more were present.

(3) Production of polybutadiene latex (a-3)

| | |
|---|---|
| Butadiene | 100 parts |
| Distilled water | 100 parts |
| Potassium rosinate | 2.0 parts |
| Potassium phosphate | 0.7 part |
| t-Dodecylmercaptan | 0.2 part |
| Potassium persulfate | 0.3 part |

A polybutadiene latex (a-3) was produced by repeating the same procedure as in (1) above, except that a mixture of the above components was used.

The gel content and average particle diameter of the rubber particles of the latex (a-3) were as follows:

| | |
|---|---|
| Gel content | 75% |
| Average particle diameter | 1,100 Å |

(4) Production of polybutadiene latex (a-4)

| | |
|---|---|
| Butadiene | 100 parts |
| Distilled water | 75 parts |
| Potassium rosinate | 2.0 parts |
| Potassium phosphate | 2.0 parts |
| t-Dodecymercaptan | 0.2 part |
| Potassium persulfate | 0.25 part |

A polybutadiene latex (a-4) was produced by repeating the same procedure as in (1) above, except that a mixture of the above components was used and the total polymerization time was changed to 55 hours.

The gel content and average particle diameter of the rubber particles of the latex (a-4) were as follows:

| | |
|---|---|
| Gel content | 70% |
| Average particle diameter | 3,000 Å |

According to the observation of the electron micrograph, substantially no particles having particle diameters of 2,000 Å or less were present.

REFERENCE EXAMPLE 2

Production of graft copolymers

(1) Production of graft copolymer (G-1)

Mixture (I)

| | |
|---|---|
| Polybutadiene latex (a-1) | 4 parts (as solids) |
| Polybutadiene latex (a-2) | 36 parts (as solids) |
| Styrene | 15 parts |
| Acrylonitrile | 5 parts |
| t-Dodecylmercaptan | 0.15 part |
| Potassium rosinate | 0.5 part |
| Potassium hydroxide | 0.01 part |
| Deionized water | 100 parts |

The above mixture (I) was fed to a reactor equipped with a jacket and a stirrer. The air inside the reactor was replaced by nitrogen, and the reactor contents were heated to 40° C. while controlling the jacket at 70° C. Thereto was added a solution prepared by dissolving 0.3 part of sodium pyrophosphate, 0.35 part of dextrose, 0.01 part of ferrous sulfate and 0.1 part of cumene hydroperoxide in 10 parts of water. The resulting mixture was subjected to reaction.

One hour after the start of the reaction, the following mixture (II) was continuously added over 4 hours and then the reaction was continued for a further 1 hour with stirring. The conversion was 96%.

| Mixture (II) | |
| --- | --- |
| Styrene | 30 parts |
| Acrylonitrile | 10 parts |
| t-Dodecylmercaptan | 0.30 part |
| Potassium rosinate | 1.0 part |
| Potassium hydroxide | 0.02 part |
| Cumene hydroperoxide | 0.15 part |
| Deionized water | 50 parts |

To the graft copolymer latex obtained was added 1.0 part of 2,6-di-tert-butyl-p-cresol as an antioxidant. Then, sulfuric acid was added thereto in a proportion of 2 parts per 100 parts of the copolymer formed to cause coagulation. The coagulation product was separated, dehydrated and dried to obtain a graft copolymer (G-1).

(2) Production of graft copolymer (G-2)

Using the polybutadiene latexes (a-1) and (a-2), a graft copolymer (G-2) was produced by repeating the same procedure as in (1) above, except that the weight ratio of styrene/acrylonitrile in the mixture (I) was changed to 10/5 and the weight ratio of styrene/acrylonitrile in the mixture (II) was changed to 30/15.

(3) Production of graft copolymer (G-3)

A graft copolymer (G-3) was produced by repeating the same procedure as in (1) above, except that the amounts of the polybutadiene latexes (a-1) and (a-2) were changed to 36 parts and 4 parts, respectively.

(4) Production of graft copolymer (G-4)

A graft copolymer (G-4) was produced by repeating the same procedure as in (1) above, except that the amount of the polybutadiene latex (a-2) was changed to 40 parts and the polybutadiene latex (a-1) was not used.

(5) Production of graft copolymer (G-5)

A graft copolymer (G-5) was produced by repeating the same procedure as in (1) above, except that 40 parts of the polybutadiene latex (a-3) was used in place of the mixture of the polybutadiene latexes (a-1) and (a-2).

(6) Production of graft copolymer (G-6)

A graft copolymer (G-6) was produced by repeating the same procedure as in (1) above, except that 40 parts of the polybutadiene latex (a-4) was used in place of the mixture of the polybutadiene latexes (a-1) and (a-2).

(7) Production of graft copolymer (G-7)

A graft copolymer (G-7) was produced by repeating the same procedure as in (1) above, except that a mixture of 36 parts of the polybutadiene latex (a-3) and 4 parts of the polybutadiene latex (a-4) was used in place of the mixture of the polybutadiene latexes (a-1) and (a-2).

(8) Production of graft copolymer (G-8)

A graft copolymer (G-8) was produced by repeating the same procedure as in (1) above, except that the amounts of the polybutadiene latexes (a-1) and (a-2) were changed to 20 parts and 20 parts, respectively.

(9) Production of graft copolymer (G-9)

A graft copolymer (G-9) was produced by repeating the same procedure as in (1) above, except that the amounts of the polybutadiene latexes (a-1) and (a-2) were changed to 12 parts and 28 parts, respectively.

(10) Production of graft copolymer (G-10)

A graft copolymer (G-10) was produced by repeating the same procedure as in (1) above, except that the amounts of the polybutadiene latexes (a-1) and (a-2) were changed to 26 parts and 14 parts, respectively.

The conversions, grafting degrees and intrinsic viscosities of the graft copolymers (G-1) to (G-10) were as follows:

| | |
| --- | --- |
| Conversion | 95–98% |
| Grafting degree | 50–70% |
| $[\eta]$ | 0.35–0.45 dl/g |

The graft copolymers (G-1) to (G-10) were mixed with alkenyl copolymers to obtain thermoplastic resin compositions of Examples 1–7 and Comparative Examples 1–10. The components and compounding recipes of these compositions are shown in Table 1. To each of the compositions was added 1.0 part of ethylenebisstearamide, and the resulting mixture was pelletized at 200° C. by a 50mm extruder. The resulting pellets were passed through a 5-ounce injection machine at 200° C., and each of the resulting molded articles was measured for physical properties.

The evaluation method and test piece for each test item were as follows:
(1) Izod impact strength
   ASTM-D256
   Test piece: $\frac{1}{2}''\times\frac{1}{4}''\times 5/2''$ (notched)
(2) Gloss
   ASTM-D523
(3) Rockwell hardness (R scale)
   HARDNESS TESTER, a product of UESHIMA
(4) Du Pont impact strength
   Du Pont Impact Tester, a product of TOYO SEIKI SEISAKUSHO, LTD.
   Test piece: 55 mm (length)×80 mm (width) x 2.4 mm (thickness)
(5) Surface appearance (gloss, weld line and flow mark of the surface of a product)

To examine the surface appearance of a molded article, each composition was molded into a telephone-shaped product of 220 mm x 145 mm x 30 mm using NEOMAT 515 with SYCAP (an injection molding machine manufactured by SUMITOMO HEAVY INDUSTRIES, LTD.). The surface appearance of the article was examined visually.

The following criterion was employed for the evaluation of the surface appearance:
   ⊚ Surface appearance was very good.
   ○ Surface appearance was good.
   Δ Surface appearance was slightly poor.
   X Surface appearance was poor.

The alkenyl copolymers used in the compositions of Examples 1–7 and Comparative Examples 1–10 were as follows:
AS-1
   LITAC 330PC, a product a Mitsui Toatsu Chemicals, Inc.
   Vinyl cyanide compound content: 32%.
   $[\eta]_{MEK}^{30°\ C.}$: 0.48 dl/g
AS-2
   AS230NP, a product of Japan Synthetic Rubber Co., Ltd.
   Vinyl cyanide compound content: 24.5% $[\eta]_{MEK}^{30°\ C.}$: 0 6 dl/g
AS-3
   An experimentally produced acrylonitrile-styrene copolymer
   Vinyl cyanide compound content: 34% $[\eta]_{MEK}^{30°\ C.}$: 0.5 dl/g

EXAMPLES 1-7 AND COMPARATIVE EXAMPLES 1-10

Evaluation results of the compositions of Examples 1-7 and Comparative Examples 1-10 are shown in Table 1.

In Examples 1-7, thermoplastic resin compositions aimed at in this invention were obtained.

Comparative Example 1 is a case of a composition in which the acrylonitrile content in the resin component of the graft copolymer (A) exceeds the range of this invention. The gloss, Izod impact strength and Du Pont impact strength were inferior.

Comparative Examples 2 and 10 is a case of a composition in which the proportion of the rubber particles having particle diameters of 2,100 Å or more in the rubber component contained in the graft copolymer (A) exceeds the range of this invention. The gloss and surface appearance were inferior.

Comparative Example 3 is a case of a composition in which the average particle diameter of the rubber component in the graft copolymer (A) is smaller than the range of this invention. The Izod impact strength and Du Pont impact strength were inferior.

Comparative Example 4 is a case of a composition in which the average particle diameter of the rubber component contained in the graft copolymer (A) exceeds the range of this invention. The gloss and surface appearance were inferior.

Comparative Example 5 is a case of a composition whose graft copolymer (A) is obtained from a latex mixture consisting of (a) smaller particle latex having an average particle diameter smaller than the range of this invention and (b) a larger particle latex having an average particle diameter falling within the range of this invention. The Izod impact strength and Du Pont impact strength were inferior.

Each of Comparative Examples 6 and 9 is a case of a composition in which the acrylonitrile content in the copolymer (B) is smaller than the range of this invention. In each case, the Izod impact strength and Du Pont impact strength were inferior.

Comparative Example 7 is a case of a composition in which the proportion of the rubber component is smaller than the range of this invention. The Izod impact strength and Du Pont impact strength were inferior.

Comparative Example 8 is a case of a composition in which the proportion of the rubber component exceeds the range of this invention. The surface appearance was inferior.

TABLE 1

| | Examples | | | | | | | Comparative Examples | | | | | | | | | |
|---|---|---|---|---|---|---|---|---|---|---|---|---|---|---|---|---|---|
| | 1 | 2 | 3 | 4 | 5 | 6 | 7 | 1 | 2 | 3 | 4 | 5 | 6 | 7 | 8 | 9 | 10 |
| Amount of rubber component in composition (parts) | 14 | 14 | 24 | 16 | 14 | 14 | 6 | 14 | 14 | 14 | 14 | 14 | 14 | 3.2 | 38 | 14 | 14 |
| Type and amount (parts) of graft copolymer (A) in composition | | | | | | | | | | | | | | | | | |
| G-1 | 35 | — | 60 | 40 | — | — | 15 | — | — | — | — | — | 35 | 8 | 95 | — | — |
| G-2 | — | — | — | — | — | — | — | 35 | — | — | — | — | — | — | — | 35 | — |
| G-3 | — | — | — | — | — | — | — | — | 35 | — | — | — | — | — | — | — | — |
| G-4 | — | 35 | — | — | — | — | — | — | — | — | — | — | — | — | — | — | — |
| G-5 | — | — | — | — | — | — | — | — | — | 35 | — | — | — | — | — | — | — |
| G-6 | — | — | — | — | — | — | — | — | — | — | 35 | — | — | — | — | — | — |
| G-7 | — | — | — | — | — | — | — | — | — | — | — | 35 | — | — | — | — | — |
| G-8 | — | — | — | — | 35 | — | — | — | — | — | — | — | — | — | — | — | — |
| G-9 | — | — | — | — | — | 35 | — | — | — | — | — | — | — | — | — | — | — |
| G-10 | — | — | — | — | — | — | — | — | — | — | — | — | — | — | — | — | 35 |
| Type and amount (parts) of alkenyl copolymer (B) in composition | | | | | | | | | | | | | | | | | |
| AS-1 | 65 | 65 | 40 | — | 65 | 65 | 85 | 65 | 65 | 65 | 65 | 65 | — | 92 | 5 | — | 65 |
| AS-2 | — | — | — | — | — | — | — | — | — | — | — | — | 65 | — | — | 65 | — |
| AS-3 | — | — | — | 60 | — | — | — | — | — | — | — | — | — | — | — | — | — |
| Gloss (%) | 94 | 96 | 92 | 93 | 90 | 92 | 93 | 83 | 78 | 96 | 70 | 85 | 92 | 92 | 88 | 80 | 85 |
| Surface appearance | | | | | | | | | | | | | | | | | |
| Surface gloss | | | | | | | | | Δ | | Δ | | | | Δ | | Δ |
| Weld line | | | | | | | | | Δ | | Δ | Δ | | | Δ | | Δ |
| Flow mark | | | | | | | | | Δ | | Δ | Δ | | | Δ | | |
| Izod impact strength (kg · cm/cm) | 17 | 14 | 42 | 20 | 22 | 19 | 10 | 12 | 21 | 8 | 22 | 10 | 7 | 3 | 40 or above | 7 | 19 |
| Du Pont impact strength (kg · cm) | 150 | 140 | 230 | 170 | 150 | 150 | 90 | 120 | 160 | 60 | 165 | 90 | 50 | 10 | 250 or above | 50 | 160 |
| Rockwell hardness | 111 | 111 | 100 | 108 | 111 | 111 | 111 | 111 | 110 | 111 | 112 | 111 | 112 | 120 | 80 | 112 | 117 |

What is claimed is:

1. A thermoplastic resin composition, consisting essentially of (A) 10-90% by weight of a graft copolymer obtained by polymerizing a monomer mixture consisting of an alkenyl cyanide compound and an aromatic alkenyl compound in the presence of a butadiene rubber latex in which 50-96% by weight of butadiene rubber particles (A-1) having an average particle diameter of at least 1,300 Å but not more than 2,000 Å, and 3-50% by weight of butadiene rubber particles (A-2) having an average particle diameter of 2,200 Å or more are dispersed, provided that the alkenyl cyanide compound content in the resin component of the graft copolymer (A) is at least 10% by weight but 29% or less by weight, and (B) 90-10% by weight of a copolymer of an alkenyl cyanide compound with an aromatic alkenyl compound having an alkenyl cyanide compound content of 31-40% by weight, the difference in the bound alkenyl cyanide compound content between the resin component of the graft polymer (A) and the copolymer (B) being 3–30% by weight and the proportion of the rubber component in the composition being 5–30% by weight.

2. The thermoplastic resin composition according to claim 1, wherein the proportion of the (A-1) component is 70–97% by weight and the proportion of the (A-2) component is 30–3% by weight.

3. The thermoplastic resin composition according to claim 1, wherein the proposition of the (A-1) component is 60–90% by weight and the proportion of the (A-2) component is 40–10% by weight.

4. The thermoplastic resin composition according to claim 1, wherein the difference in the bound alkenyl cyanide compound is 4–15% by weight.

5. The thermoplastic resin composition according to claim 1, wherein the average particle diameter of the (A-1) component is 1,500–2,000 Å.

6. The thermoplastic resin composition according to claim 1, wherein the average particle diameter of the (A-1) component is 1,600–1,900 Å.

7. The thermoplastic resin composition according to claim 1, wherein the average particle diameter of the (A-2) component is 2,200–7,000 Å.

8. The thermoplastic resin composition according to claim 1, wherein the average particle diameter of the (A-2) component is 2,200–2,800 Å.

9. The thermoplastic resin composition according to claim 6, wherein the average particle diameter of the (A-2) component is 2,200–2,800 Å.

10. The thermoplastic resin composition according to claim 1, wherein the alkenyl cyanide compound content in the copolymer (A) is 20–29% by weight.

11. The thermoplastic resin composition according to claim 1, wherein the alkenyl cyanide compound content in the copolymer (B) is 31–35% by weight.

12. The thermoplastic resin composition according to claim 1, wherein the proportion of the graft copolymer (A) is 10–70% by weight and the proportion of the copolymer (B) is 90–30% by weight.

13. The thermoplastic resin composition according to claim 1, wherein the rubber component content in the composition is 10–25% by weight.

14. The thermoplastic resin composition according to claim 1, wherein the butadiene rubber latex is a latex of at least one polymer selected from the group consisting of a butadiene homopolymer, a butadiene-styrene copolymer and a butadiene-acrylonitrile copolymer.

15. The thermoplastic resin composition according to claim 1, wherein the gel content of the butadiene rubber is 60–90% by weight.

16. The thermoplastic resin composition according to claim 1, wherein the aromatic alkenyl compound is at least one compound selected from the group consisting of styrene, α-methylstyrene, vinyltoluene and halogenated styrenes.

17. The thermoplastic resin composition according to claim 1, wherein the alkenyl cyanide compound is acrylonitrile, methacrylonitrile or a mixture thereof.

18. The thermoplastic resin composition according to claim 1, wherein the butadiene rubber content in the graft copolymer (A) is 10–60% by weight.

19. The thermoplastic resin composition according to claim 1, wherein the butadiene rubber content in the graft copolymer (A) is 15–55% by weight.

20. The thermoplastic resin composition according to claim 1, wherein the butadiene rubber content in the graft copolymer (A) is 10–50% by weight.

21. The thermoplastic resin composition according to claim 1, wherein the graft copolymer (A) has a grafting degree of 40–90% by weight.

22. The thermoplastic resin composition according to claim 1, wherein the methyl ether ketone-soluble portion of the graft copolymer (A) has an intrinsic viscosity of $[\eta]$ of 0.3–0.8 dl/g as measured as 30° C. in methyl ethyl ketone.

23. The thermoplastic resin composition according to claim 1, wherein the copolymer (B) has an intrinsic viscosity $[\eta]$ of 0.3–0.85 dl/g as measured at 30° C. in methyl ethyl ketone.

* * * * *